(12) United States Patent
Mitsutani

(10) Patent No.: US 9,878,620 B2
(45) Date of Patent: Jan. 30, 2018

(54) HYBRID VEHICLE

(71) Applicant: Toyota Jidosha Kabushiki Kaisha, Toyota-shi Aichi-ken (JP)

(72) Inventor: Noritake Mitsutani, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 195 days.

(21) Appl. No.: 15/017,945

(22) Filed: Feb. 8, 2016

(65) Prior Publication Data

US 2016/0229309 A1 Aug. 11, 2016

(30) Foreign Application Priority Data

Feb. 10, 2015 (JP) .................. 2015-24062

(51) Int. Cl.
*H01H 47/00* (2006.01)
*B60L 3/00* (2006.01)
*B60L 11/12* (2006.01)
*B60L 11/14* (2006.01)

(52) U.S. Cl.
CPC ........... *B60L 3/0084* (2013.01); *B60L 11/126* (2013.01); *B60L 11/14* (2013.01); *B60L 2240/80* (2013.01); *Y02T 10/6239* (2013.01); *Y02T 10/6286* (2013.01); *Y02T 10/648* (2013.01); *Y02T 10/7005* (2013.01); *Y02T 10/7077* (2013.01)

(58) Field of Classification Search
CPC .................................................. B60L 3/0084

USPC ......................................................... 361/172
See application file for complete search history.

(56) References Cited

U.S. PATENT DOCUMENTS 8,360,184 B2 * 1/2013 Kydd ................. B60L 11/1842
180/65.265
9,522,671 B2 * 12/2016 Trippel ................. B60W 10/06

FOREIGN PATENT DOCUMENTS

JP 2013-123941 A 6/2013
JP 2013-212755 A 10/2013

* cited by examiner

*Primary Examiner* — Stephen W Jackson
(74) *Attorney, Agent, or Firm* — Dinsmore & Shohl LLP

(57) ABSTRACT

An OR circuit 61 of a relay drive unit 60 provides an ON output when at least one of a drive signal output from a battery ECU 52 and a latch signal output from an HVECU 70 is ON signal, while providing an OFF output when both the drive signal and the latch signal are OFF signals. The HVECU 70 switches off the latch signal when the engine operates, while switching on the latch signal when the engine is at stop. When no abnormality of communication with the HVECU 70 is detected and a specified time duration has not elapsed since detection of the abnormality of communication with the HVECU 70, the battery ECU 52 switches on the drive signal. When the specified time duration has elapsed since detection of the abnormality of communication with the HVECU 70, the battery ECU 52 switches off the drive signal.

10 Claims, 6 Drawing Sheets

HYBRID VEHICLE

CROSS-REFERENCE TO RELATED APPLICATIONS

This application claims priority to Japanese Patent Application No. 2015-24062 filed Feb. 10, 2015, the entire contents of which are hereby incorporated by reference.

TECHNICAL FIELD

The present disclosure relates to a hybrid vehicle and more specifically a hybrid vehicle equipped with an engine, a first motor, a second motor, a battery, a relay, a first controller and a second controller.

BACKGROUND ART

According to one proposed configuration, a hybrid vehicle includes an engine, a first motor for starting the engine, a second motor for driving, a battery, a system main relay, a capacitor and a control unit (see, for example, Patent Literature 1). The system main relay is provided on a power line that is arranged to connect the first motor and the second motor with the battery. The capacitor is placed on the first and second motors-side of the system main relay in the power line. The control unit is activated with supply of electric power from a low voltage battery to control the engine, the first motor, the second motor and the system main relay. In the hybrid vehicle of this configuration, when the supply of electric power to the control unit is once blocked to turn off the system main relay and is subsequently recovered, in the state that the engine stops operation during a run of the hybrid vehicle, the control unit controls the engine, the first motor and the second motor to cause the engine to be cranked by the first motor and started within the range of capacity of the capacitor in the off state of the system main relay. After a start of the engine, the control unit controls the engine, the first motor and the second motor to allow for a battery-less drive of the hybrid vehicle that runs with operation of the engine in the off state of the system main relay. This enables the hybrid vehicle to continue driving without a stop.

CITATION LIST

Patent Literature

PTL 1: JP 2013-123941A

SUMMARY

Technical Problem

The hybrid vehicle of the above configuration turns off the system main relay when the supply of electric power from the low voltage battery to the controller is blocked. There is accordingly a need to more reliably allow for the battery-less drive of the hybrid vehicle with taking into account the relationship between the capacity of the capacitor and the energy required for starting the engine in the state that the engine stops operation during a run of the hybrid vehicle.

Some embodiments described herein reliably ensure a battery-less drive of a hybrid vehicle when there is a need for the battery-less drive in the state that an engine stops operation during a run of the hybrid vehicle.

Solution to Problem

Some embodiments may be implemented by the following aspects or configurations.

The present disclosure is directed to a hybrid vehicle. The hybrid vehicle includes an engine that is configured to output power for driving, a first motor that is configured to input and output power from and to an output shaft of the engine, a second motor that is configured to input and output power for driving, a battery that is configured to be chargeable and dischargeable, a relay that is configured to connect and disconnect the first motor and the second motor with and from the battery, a first controller that is configured to control the engine, the first motor and the second motor, a second controller that is configured to manage the battery, and a drive unit that is configured to turn on and off the relay. One controller of the first controller and the second controller outputs a drive signal for turning on the relay, to the drive unit, the other controller of the first controller and the second controller outputs a drive latch signal for keeping on the relay, to the drive unit, and the drive unit turns on the relay when at least one of the drive signal and the drive latch signal is on signal, and turns off the relay when both the drive signal and the drive latch signal are off signals.

The hybrid vehicle according to this aspect of the disclosure includes the first controller that is configured to control the engine, the first motor and the second motor, the second controller that is configured to manage the battery, and the drive unit that is configured to turn on and off the relay. One controller of the first controller and the second controller outputs the drive signal for turning on the relay, to the drive unit. The other controller of the first controller and the second controller outputs the drive latch signal for keeping on the relay, to the drive unit. The drive unit turns on the relay when at least one of the drive signal and the drive latch signal is on signal, while turning off the relay when both the drive signal and the drive latch signal are off signals.

The hybrid vehicle of this configuration operates as described below. In one aspect of this hybrid vehicle, the second controller may output the drive signal to the drive unit, and the first controller may output the drive latch signal to the drive unit. In this case, when both the drive signal output from the second controller and the drive latch signal output from the first controller are on signals, the relay is turned on by the drive unit. In this state, when the drive signal output from the second controller is switched off, the drive latch signal output from the first controller is kept as on signal, so that the relay is kept on by the drive unit. When the drive signal output from the second controller is switched off during an electric power drive of the hybrid vehicle that runs using only the power from the second motor with stop of operation of the engine in the on state of the relay, the drive latch signal output from the first controller is kept as on signal, so that the relay is kept on by the drive unit. This causes the engine to be cranked by the first motor and started with transmission of electric power to and from the battery. After a start of the engine, when the drive latch signal output from the first controller is switched off, the relay is turned off by the drive unit. This allows for a battery-less drive of the hybrid vehicle that runs with operation of the engine in the off state of the relay. When there is a need for a battery-less drive during the electric power drive of the hybrid vehicle, this control reliably ensures start of the engine and the battery-less drive of the hybrid vehicle. The description above is about the case where the second controller may output the drive signal to the drive unit, and the first controller may output the drive latch signal to the drive unit. However, the same applies to the case where the first controller may output the drive signal to the drive unit, and the second controller may output the drive latch signal to the drive unit.

DESCRIPTION OF EMBODIMENTS

The following describes some aspects of the disclosed subject matter with reference to embodiments.

Figure 1:
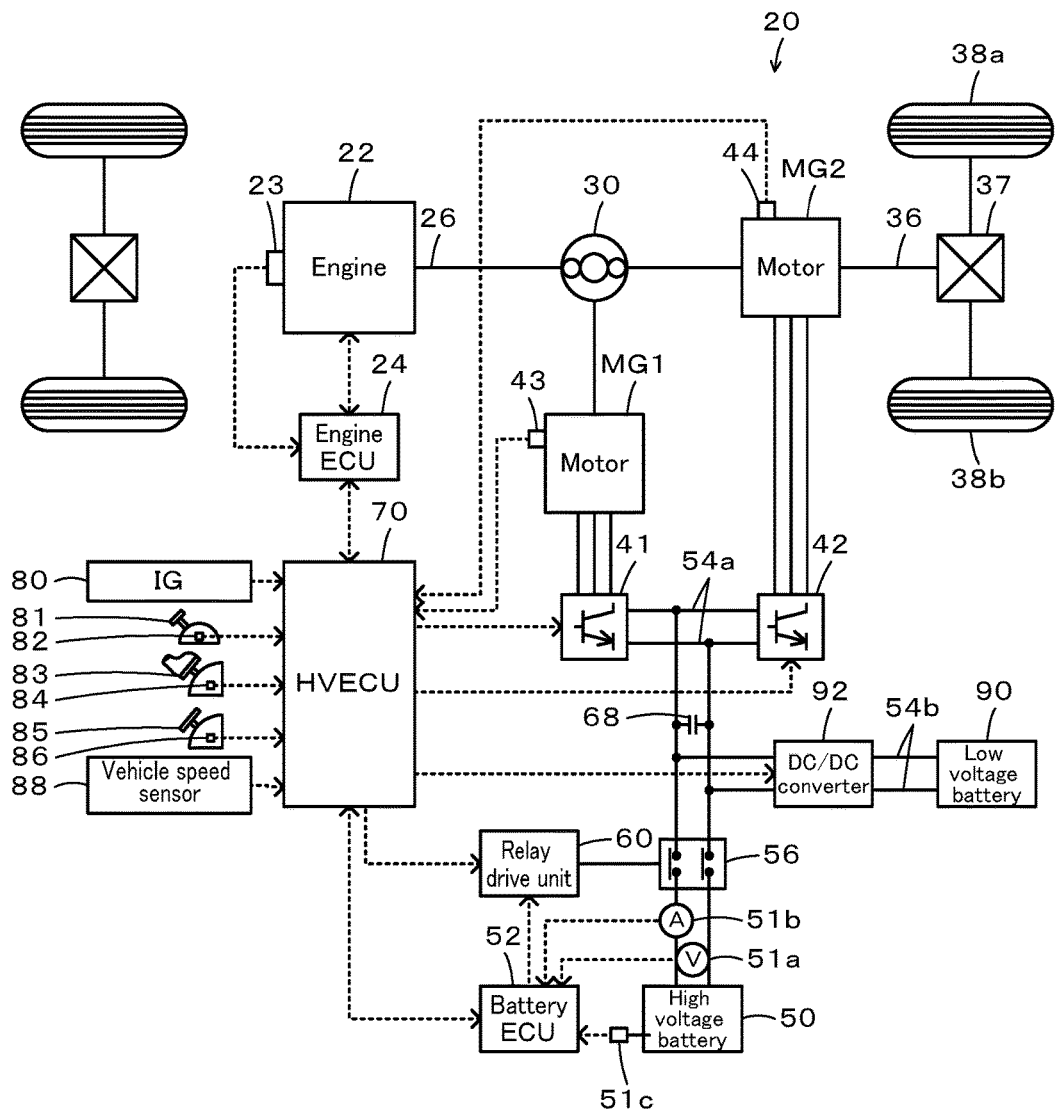
FIG. 1 is a configuration diagram illustrating the schematic configuration of a hybrid vehicle according to one embodiment.

FIG. 1 is a configuration diagram illustrating the schematic configuration of a hybrid vehicle 20 according to one embodiment. As illustrated, the hybrid vehicle 20 of the embodiment includes an engine 22, a planetary gear 30, motors MG1 and MG2, inverters 41 and 42, a high voltage battery 50, a system main relay 56, a relay drive unit 60, a low voltage battery 90, a DC-DC converter 92 and a hybrid electronic control unit (hereinafter referred to as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22, for example, a crank position θcr from a crank position sensor 23 configured to detect the rotational position of a crankshaft 26, and a throttle position TH from a throttle valve position sensor configured to detect the position of the throttle valve. The engine ECU 24 outputs, via its output port, various control signals for operation control of the engine 22, for example, a drive control signal to a throttle motor configured to adjust the position of a throttle valve, a drive control signal to a fuel injection valve and a drive control signal to an ignition coil integrated with an igniter. The engine ECU 24 is connected with the HVECU 70 via their communication ports to perform operation control of the engine 22 in response to control signals from the HVECU 70 and output data regarding the operating conditions of the engine 22 to the HVECU 70 as appropriate. The engine ECU 24 computes the rotation speed of the crankshaft 26, which is equal to a rotation speed Ne of the engine 22, based on the crank position θcr detected by the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 38a and 38b via a differential gear 37. The planetary gear 30 also includes a carrier that is connected with the crankshaft 26 of the engine 22.

The motor MG1 is configured, for example, as a synchronous motor generator. The motor MG1 has the rotor connected with the sun gear of the planetary gear 30 as described above. The motor MG2 is configured, for example, as a synchronous motor generator. The motor MG2 has a rotor connected with the drive shaft 36. The inverters 41 and 42 serve to drive the motors MG1 and MG2. The inverters 41 and 42 are connected with the high voltage battery 50 by high voltage power lines 54a. A smoothing capacitor 68 is connected with the high voltage power lines 54a. The HVECU 70 performs switching control of a plurality of switching elements (not shown) of the inverters 41 and 42 to rotate and drive the motors MG1 and MG2.

The high voltage battery 50 is configured, for example, as a lithium ion secondary battery or a nickel hydride secondary battery. The high voltage battery 50 is connected with the inverters 41 and 42 by the high voltage power lines 54a as described above. The high voltage battery 50 is managed by a battery electronic control unit (hereinafter referred to as "battery ECU") 52.

Figure 2:
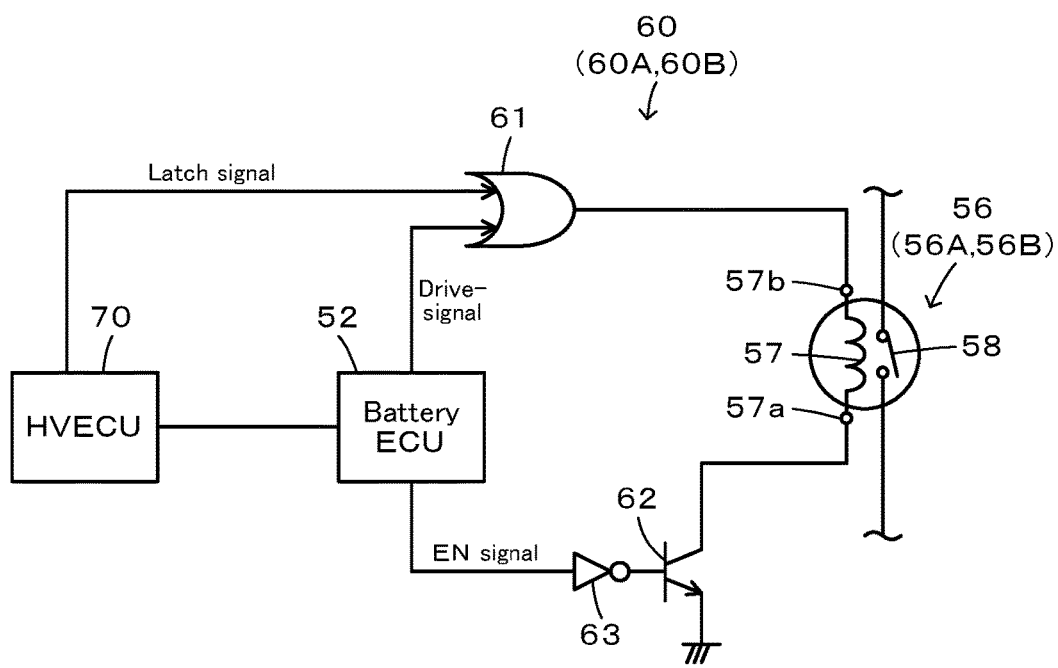
FIG. 2 is a configuration diagram illustrating the schematic configuration of the system main relay, the relay drive unit and their peripheries.

FIG. 2 is a configuration diagram illustrating the schematic configuration of the system main relay 56, the relay drive unit 60 and their peripheries. As shown in FIGS. 1 and 2, the system main relay 56 includes a positive electrode-side relay 56A and a negative electrode-side relay 56B. As shown in FIG. 1, the positive electrode-side relay 56A and the negative electrode-side relay 56B are respectively provided on a positive bus bar and a negative bus bar of the high voltage power lines 54a to be arranged on the high voltage battery 50-side of the smoothing capacitor 68 and the DC-DC converter 92. The system main relay 56 serves to connect and disconnect the inverters 41 and 42 with and from the high voltage battery 50 by on-off operations of the positive electrode-side relay 56A and the negative electrode-side relay 56B. As shown in FIG. 2, the relay drive unit 60 includes a positive electrode-side unit 60A and a negative electrode-side unit 60B respectively configured to turn on and off the positive electrode-side relay 56A and the negative electrode-side relay 56B. The positive electrode-side relay 56A and the negative electrode-side relay 56B are similarly configured, and the positive electrode-side unit 60A and the negative electrode-side unit 60B are similarly configured. Accordingly, in the description below, the configurations and the operations of the positive electrode-side relay 56A and the negative electrode-side relay 56B are described as the configuration and the operation of the system main relay 56. The configurations and the operations of the positive electrode-side unit 60A and the negative electrode-side unit 60B are described as the configuration and the operation of the relay drive unit 60.

As shown in FIG. 2, in the system main relay 56, when electricity is applied to a coil 57, a moving member 58 moves by the magnetic force of the coil 57 generated by the applied electric current. The system main relay 56 is turned on when a moving contact mounted on the moving member 58 comes into contact with a fixed contact. The system main relay 56 is turned off when application of exciting current to the coil 57 is stopped to separate the moving contact from the fixed contact.

The relay drive unit 60 includes an OR circuit 61, a switching element (transistor) 62 and an inverting circuit 63. The coil 57 of the system main relay 56 has one terminal 57a that is grounded via the switching element 62 and the other terminal 57b that is connected with an output terminal of the OR circuit 61.

The OR circuit 61 inputs a signal from the battery ECU 52 and a signal from the HVECU 70 and outputs their logical sum to the other terminal 57b of the coil 57. The signal input from the battery ECU 52 is a signal for turning on the system main relay 56 (drive signal). The signal input from the HVECU 70 is a signal for keeping on the system main relay 56 (latch signal). More specifically, the OR circuit 61 provides an ON output (to set the potential of the other terminal 57b of the coil 57 to a specified positive potential) when at least one of the drive signal input from the battery ECU 52 and the latch signal input from the HVECU 70 is ON signal, while providing an OFF output (to set the potential of the other terminal 57b of the coil 57 to value 0) when both the drive signal and the latch signal are OFF signals.

The switching element 62 is placed between one terminal 57a of the coil 57 and grounding. The inverting circuit 63 inputs a signal from the battery ECU 52, inverts the input signal and outputs the inverted signal to the switching element 62. The signal input from the battery ECU 52 is a signal for switching off the switching element 62 (EN signal). The EN signal is generally off and is switched on when there is a need to forcibly turn off the system main relay 56. More specifically, the inverting circuit 63 provides an ON output (to switch on the switching element 62) when the EN signal input from the battery ECU 52 is OFF signal, while providing an OFF output (to switch off the switching element 62) when the EN signal input from the battery ECU 52 is ON signal.

In the relay drive unit 60 of this configuration, the switching element 62 is generally on and is switched off according to the EN signal input from the battery ECU 52 when there is a need to forcibly turn off the system main relay 56. Basically, when the OR circuit 61 provides an ON output, the system main relay 56 is turned on with application of electricity to the coil 57. When the OR circuit 61 provides an OFF output, on the other hand, the system main relay 56 is turned off with no application of electricity to the coil 57. When the switching element 62 is switched off according to the ON state of the EN signal input from the battery ECU 52, the system main relay 56 is turned off whether the output from the OR circuit 61 is an ON output or an OFF output. When there is a need to forcibly turn off the system main relay 56 during operation of the battery ECU 52, this configuration allows the system main relay 56 to be turned off whether the drive signal input from the battery ECU 52 is ON signal or OFF signal and whether the latch signal input from the HVECU 70 is ON signal or OFF signal.

The battery ECU 52 is implemented by a CPU-based microprocessor and includes a ROM that stores processing programs, a RAM that temporarily stores data, input and output ports and a communication port other than the CPU, although not being illustrated. As shown in FIGS. 1 and 2, the battery ECU 52 inputs, via its input port, signals from various sensors required for management of the high voltage battery 50. The signals from various sensors include a battery voltage Vb from a voltage sensor 51a placed between terminals of the high voltage battery 50, a battery current Ib from a current sensor 51b mounted to the output terminal of the high voltage battery 50, a battery temperature Tb from a temperature sensor 51c mounted to the high voltage battery 50, the latch signal from the HVECU 70 and the output from the OR circuit 61 of the relay drive unit 60 (potential of the other terminal 57b of the coil 57). The battery ECU 52 outputs various control signals via its output port. The various control signals include the drive signal output to the OR circuit 61 of the relay drive unit 60 and the EN signal output to the inverting circuit 63 of the relay drive unit 60. The battery ECU 52 is connected with the HVECU 70 via their communication ports. The battery ECU 52 outputs data regarding the conditions of the high voltage battery 50 to the HVECU 70 as necessary. The battery ECU 52 computes a state of charge SOC based on the integrated value of the battery current Ib from the current sensor 51b. The state of charge SOC denotes a ratio of the capacity of electric power dischargeable from the high voltage battery 50 to the entire capacity of the high voltage battery 50. The battery ECU 52 also computes an input limit Win and an output limit Wout, based on the computed state of charge SOC and the battery temperature Tb from the temperature sensor 51c. The input and output limits Win and Wout denote maximum allowable powers chargeable into and dischargeable from the high voltage battery 50.

The low voltage battery 90 is configured, for example, as a lead acid battery. As shown in FIG. 1, the low voltage battery 90 is connected with low voltage power lines 54b. The DC-DC converter 92 is connected with the high voltage power lines 54a on the inverters 41 and 42-side of the system main relay 56 and is also connected with the low voltage power lines 54b. The DC-DC converter 92 is controlled by the HVECU 70 to step down the electric power of the high voltage power lines 54a and supply the stepped-down electric power to the low voltage power lines 54b and to boost up the electric power of the low voltage power lines 54b and supply the boosted-up electric power to the high voltage power lines 54a. The engine ECU 24 and the HVECU 70 operate with supply of electric power from the low voltage battery 90.

The HVECU 70 is implemented by a CPU-based microprocessor and includes a ROM that stores processing programs, a RAM that temporarily stores data, input and output ports and a communication port other than the CPU, although not being illustrated. As shown in FIGS. 1 and 2, the HVECU 70 inputs signals from various sensors via its input port. The signals from various sensors include rotational positions θm1 and θm2 from rotational position detection sensors 43 and 44 configured to detect the rotational positions of the rotors of the motors MG1 and MG2, phase currents from current sensors configured to detect electric currents flowing through the respective phases of the motors MG1 and MG2, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85 and a vehicle speed V from a vehicle speed sensor 88. The HVECU 70 outputs various control signals via its output port. The various control signals include switching control signals output to switching elements (not shown) of the inverters 41 and 42 and the latch signal output to the OR circuit 61 of the relay drive unit 60. The HVECU 70 is connected with the engine ECU 24 and the battery ECU 52 via their communication ports as described above. The HVECU 70 sends and receives various control signals and data to and from the engine ECU 24 and the battery ECU 52. The HVECU 70 computes rotation speeds Nm1 and Nm2 of the motors MG1 and MG2 based on the rotational positions θm1 and θm2 of the rotors of the motors MG1 and MG2 from the rotational position detection sensors 43 and 44.

The hybrid vehicle 20 of the embodiment having the above configuration runs in different drive modes, for example, a hybrid drive mode (HV drive mode), an electric drive mode (EV drive mode) and a battery-less drive mode. In the HV drive mode, the hybrid vehicle 20 runs with operating the engine 22 and driving the motors MG1 and MG2. In the EV drive mode, the hybrid vehicle 20 runs with stopping operation of the engine 22 and driving the motor MG2. In the battery-less drive mode, the hybrid vehicle 20 runs with operating the engine 22 and driving the motors MG1 and MG2 without charging and discharging the high voltage battery 50. The system main relay 56 is on in the EV drive mode and in the HV drive mode and is generally off in the battery-less drive mode.

During a run in the HV drive mode, the HVECU 70 first sets a required torque Tr* for driving (to be output to the driveshaft 36), based on the accelerator position Acc from the accelerator pedal position sensor 84 and the vehicle speed V from the vehicle speed sensor 88. The HVECU 70 subsequently multiplies the set required torque Tr* by a rotation speed Nr of the driveshaft 36 to calculate a driving power Pdrv* required for driving. The rotation speed Nr of the driveshaft 36 may be, for example, the rotation speed Nm2 of the motor MG2 or a rotation speed obtained by multiplying the vehicle speed V by a conversion factor. The HVECU 70 subtracts a required charge-discharge power Pb* of the high voltage battery 50 (positive value in the case of discharging from the high voltage battery 50) from the calculated driving power Pdrv* to set a required power Pe* required for the vehicle. The HVECU 70 then sets a target rotation speed Ne* and a target torque Te* of the engine 22 and torque commands Tm1* and Tm2* of the motors MG1 and MG2 such as to cause the required power Pe* to be output from the engine 22 and cause the required torque Tr* to be output to the driveshaft 36 within the range of the input and output limits Win and Wout of the high voltage battery 50. The HVECU 70 performs switching control of the switching elements of the inverters 41 and 42 to drive the motors MG1 and MG2 with the torque commands Tm1* and Tm2*, while sending the target rotation speed Ne* and the target torque Te* to the engine ECU 24. When receiving the target rotation speed Ne* and the target torque Te* of the engine 22, the engine ECU 24 performs, for example, intake air flow control, fuel injection control and ignition control of the engine 22 such as to operate the engine 22 based on the received target rotation speed Ne* and target torque Te*. Upon satisfaction of a stop condition of the engine 22 during a run in the HV drive mode, for example, when the required power Pe* becomes equal to or less than a stop threshold value Pstop, the hybrid vehicle 20 stops operation of the engine 22 and shifts the drive mode to the EV drive mode.

During a run in the EV drive mode, the HVECU 70 first sets the required torque Tr* in the same manner as in the HV drive mode. The HVECU 70 subsequently sets the torque command Tm1* of the motor MG1 to value 0 and sets the torque command Tm2* of the motor MG2 such as to cause the required torque Tr* to be output to the driveshaft 36 within the range of the input and output limits Win and Wout of the high voltage battery 50. The HVECU 70 then performs switching control of the switching elements of the inverters 41 and 42 to drive the motors MG1 and MG2 with the torque commands Tm1* and Tm2*. During a run in the EV drive mode, the HVECU 70 calculates the required power Pe* in the same manner as in the HV drive mode. Upon satisfaction of a start condition of the engine 22 during a run in the EV drive mode, for example, when the required power Pe* becomes equal to or greater than a start threshold value Pstart that is larger than the stop threshold value Pstop, the hybrid vehicle 20 starts operation of the engine 22 and shifts the drive mode to the HV drive mode.

A procedure of starting the engine 22 cranks the engine 22 by the motor MG1 with transmission of electric power to and from the high voltage battery 50 and starts operation control of the engine 22 (fuel injection control and ignition control) when the rotation speed Ne of the engine 22 reaches or exceeds a predetermined rotation speed (for example, 800 rpm, 900 rpm or 1000 rpm). In the process of cranking the engine 22, the motor MG1 outputs a cranking torque for cranking the engine 22, while the motor MG2 outputs a cancellation torque for cancelling a torque applied to the driveshaft 36 accompanied with the output of the cranking torque. In the course of starting the engine 22, drive control of the motor MG2 is continuously performed to output the required torque Tr* to the driveshaft 36.

During a run in the battery-less drive mode, the HVECU 70 first sets the required torque Tr* and calculates the driving power Pdrv* in the same manner as in the HV drive mode. The HVECU 70 subsequently sets the driving power Pdrv* to the required power Pe*. The HVECU 70 then sets the target rotation speed Ne* and the target torque Te* of the engine 22 and the torque commands Tm1* and Tm2* of the motors MG1 and MG2 such as to cause the required power Pe* to be output from the engine 22 and cause the required torque Tr* to be output to the driveshaft 36. The HVECU 70 performs switching control of the switching elements of the inverters 41 and 42 to drive the motors MG1 and MG2 with the torque commands Tm1* and Tm2*, while sending the target rotation speed Ne* and the target torque Te* to the engine ECU 24. When receiving the target rotation speed Ne* and the target torque Te* of the engine 22, the engine ECU 24 performs, for example, intake air flow control, fuel injection control and ignition control of the engine 22 such as to operate the engine 22 based on the received target rotation speed Ne* and target torque Te*. As described above, the system main relay 56 is generally off during a run in the battery-less drive mode. The hybrid vehicle 20 may thus be driven with regulating the required power Pe* to charge and discharge the smoothing capacitor 68 within the range of the capacity of the smoothing capacitor 68.

Figure 3:
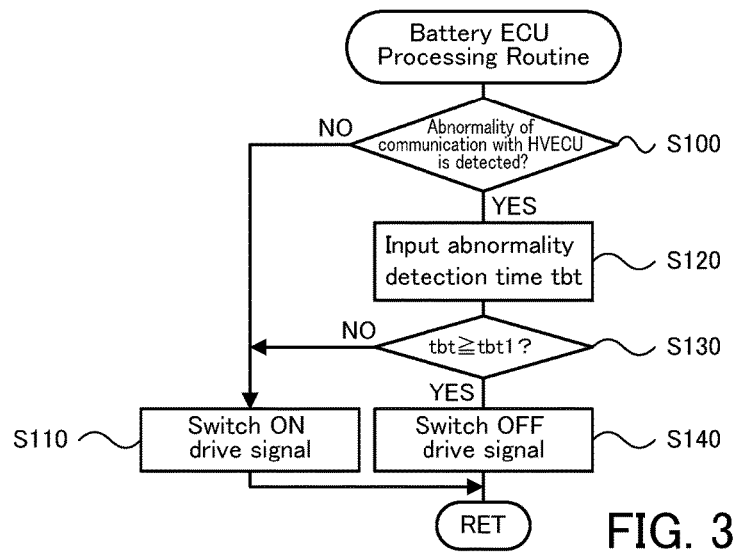
FIG. 3 is a flowchart showing one example of battery ECU processing routine performed by the battery ECU of the embodiment.
Figure 4:
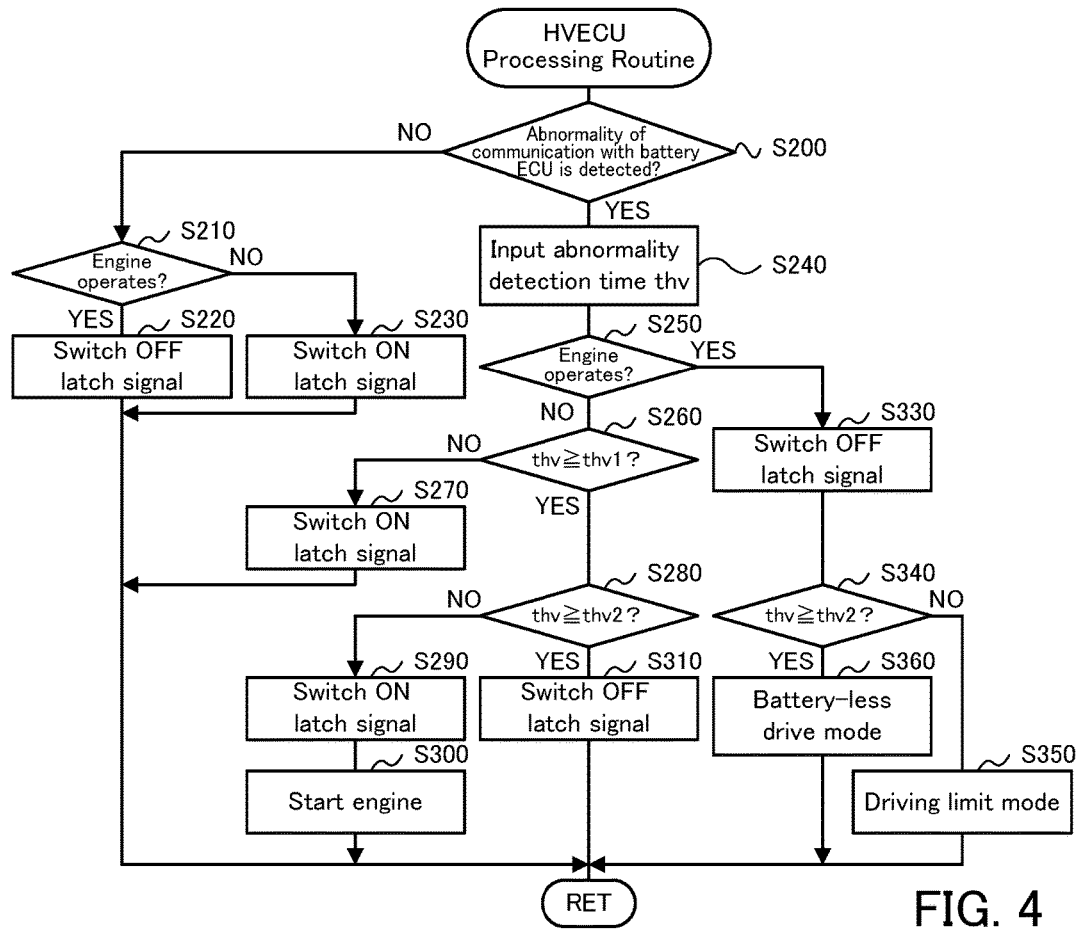
FIG. 4 is a flowchart showing one example of HVECU processing routine performed by the HVECU of the embodiment.

The following describes the operations of the hybrid vehicle 20 of the embodiment having the configuration described above. FIG. 3 is a flowchart showing one example of battery ECU processing routine performed by the battery ECU 52 of the embodiment. FIG. 4 is a flowchart showing one example of HVECU processing routine performed by the HVECU 70 of the embodiment. These routines are performed repeatedly. The following sequentially describes these routines. As described above, the switching element 62 is generally on and is switched off when there is a need to forcibly turn off the system main relay 56.

On start of the battery ECU processing routine of FIG. 3, the battery ECU 52 first determines whether an abnormality of communication with the HVECU 70 is detected (step S100). According to this embodiment, an abnormality of communication with the HVECU 70 is detected when no signal is received from the HVECU 70 for a predetermined time period (for example, several hundred msec). When a signal is then received from the HVECU 70 (when an abnormality of communication with the HVECU 70 disappears), detection of the abnormality of communication with the HVECU 70 is removed. The abnormality of communication with the HVECU 70 detected by the battery ECU 52 includes not only an abnormality of communication between the battery ECU 52 and the HVECU 70 during operation of the HVECU 70 but an abnormality of communication between the battery ECU 52 and the HVECU 70 caused by stopping the HVECU 70. The cause of stopping the HVECU 70 may be, for example, stopping the power supply from the low voltage battery 90 to the HVECU 70. When the HVECU 70 is at stop, the hybrid vehicle 20 fails to control the engine 22 and the motors MG1 and MG2 and thereby runs without power.

When it is determined at step S100 that no abnormality of communication with the HVECU 70 is detected, the battery ECU 52 switches on the drive signal input to the OR circuit 61 (step S110) and terminates this routine. In this case, the system main relay 56 is kept on.

When it is determined at step S100 that an abnormality of communication with the HVECU 70 is detected, on the other hand, the battery ECU 52 inputs an abnormality detection time tbt that denotes a time duration when the abnormality of communication with the HVECU 70 is detected (step S120). The abnormality detection time tbt input here is the count on a timer that starts counting by detection of an abnormality of communication with the HVECU 70 as the trigger.

The battery ECU 52 subsequently compares the abnormality detection time tbt with a specified time tbt1 (step S130). The specified time tbt1 is, for example, 1 second or 2 seconds. When the abnormality detection time tbt is shorter than the specified time tbt1, the battery ECU 52 switches on the drive signal input to the OR circuit 61 (step S110) and terminates this routine. In this case, the system main relay 56 is kept on.

When the abnormality detection time tbt is equal to or longer than the specified time tbt1 at step S130, on the other hand, the battery ECU 52 switches off the drive signal input to the OR circuit 61 (step S140) and terminates this routine. In this case, the system main relay 56 is kept on when the latch signal input from the HVECU 70 to the OR circuit 61 is ON signal, while being turned off when the latch signal is OFF signal.

When the abnormality of communication with the HVECU 70 disappears before the abnormality detection time tbt becomes equal to or longer than the specified time tbt1, the battery ECU 52 determines that no abnormality of communication with the HVECU 70 is detected at step S100, switches on the drive signal input to the OR circuit 61 at step S110, and then terminates this routine. In this case, the drive signal input to the OR circuit 61 is not switched off, so that the system main relay 56 is kept on.

The following describes the HVECU processing routine of FIG. 4. On start of the HVECU processing routine, the HVECU 70 first determines whether an abnormality of communication with the battery ECU 52 is detected (step S200). According to this embodiment, an abnormality of communication with the battery ECU 52 is detected when no signal is received from the battery ECU 52 for a predetermined time period (for example, several hundred msec). When a signal is then received from the battery ECU 52 (when an abnormality of communication with the battery ECU 52 disappears), detection of the abnormality of communication with the battery ECU 52 is removed. The abnormality of communication with the battery ECU 52 detected by the HVECU 70 includes not only an abnormality of communication between the battery ECU 52 and the HVECU 70 during operation of the battery ECU 52 but an abnormality of communication between the battery ECU 52 and the HVECU 70 caused by stopping the battery ECU 52. The cause of stopping the battery ECU 52 may be, for example, stopping the power supply from the low voltage battery 90 to the battery ECU 52.

When it is determined at step S200 that no abnormality of communication with the battery ECU 52 is detected, the HVECU 70 subsequently determines whether the engine 22 operates (step S210). On determination that the engine 22 operates, the HVECU 70 switches off the latch signal input to the OR circuit 61 of the relay drive unit 60 (step S220) and terminates this routine. On determination that the engine 22 is at stop, on the other hand, the HVECU 70 switches on the latch signal input to the OR circuit 61 (step S230) and terminates this routine. On the assumption that no abnormality of communication between the HVECU 70 and the battery ECU 52 is detected, the drive signal input from the battery ECU 52 to the OR circuit 61 is ON signal and the EN signal input to the inverting circuit 63 is OFF signal, so that the system main relay 56 is kept on. Accordingly the hybrid vehicle 20 runs in the HV drive mode or in the EV drive mode.

When it is determined at step S200 that an abnormality of communication with the battery ECU 52 is detected, on the other hand, the HVECU 70 inputs an abnormality detection time thv that denotes a time duration when the abnormality of communication with the battery ECU 52 is detected (step S240). The abnormality detection time thv input here is the count on a timer that starts counting by detection of an abnormality of communication with the battery ECU 52 as the trigger.

The HVECU 70 subsequently determines whether the engine 22 operates (step S250). On determination that the engine 22 is at stop, the HVECU 70 compares the abnormality detection time thv with a specified time thv1 (step S260). The specified time thv1 may be, for example, 100 msec, 200 msec or 300 msec.

When the abnormality detection time thv is shorter than the specified time thv1 at step S260, the HVECU 70 switches on the latch signal input to the OR circuit 61 (step S270) and terminates this routine. On detection of an abnormality of communication with the battery ECU 52, the HVECU 70 cannot determine whether the battery ECU 52 operates or is at stop. When the battery ECU 52 operates, the drive signal input from the battery ECU 52 to the OR circuit 61 is ON signal, so that the system main relay 56 is kept on. When the battery ECU 52 is at stop, on the other hand, the drive signal input from the battery ECU 52 to the OR circuit 61 is OFF signal. According to this embodiment, as described above, even in the case where no abnormality of communication with the battery ECU 52 is detected, the latch signal input from the HVECU 70 to the OR circuit 61 is switched on when the engine 22 is at stop. On subsequent detection of an abnormality of communication with the battery ECU 52, the latch signal input to the OR circuit 61 is kept on when the engine 22 is at stop. This results in keeping on the system main relay 56.

In the case where an abnormality of communication between the battery ECU 52 and the HVECU 70 occurs and subsequently disappears, the hybrid vehicle 20 may restart a run in the EV drive mode when the engine 22 is at stop and the abnormality detection time thv is shorter than the specified time thv1.

When the abnormality detection time thv is equal to or longer than the specified time thv1 at step S260, the HVECU 70 compares the abnormality detection time thv with a specified time thv2 that is longer than the specified time thv1 (step S280). The specified time thv2 is equal to or slightly longer than the specified time tbt1 described above. As described above, the battery ECU 52 switches off the drive signal input to the OR circuit 61 when the abnormality detection time tbt becomes equal to or longer than the specified time thv1. This comparison is accordingly for the purpose of estimating whether the drive signal input from the battery ECU 52 to the OR circuit 61 is ON signal or OFF signal.

When the abnormality detection time thv is shorter than the specified time thv2 at step S280, the HVECU 70 switches on the latch signal input to the OR circuit 61 (step S290), starts the engine 22 (step S300) and terminates this routine. The system main relay 56 is kept on by keeping on the latch signal input to the OR circuit 61. The cooperative control of the HVECU 70 and the engine ECU 24 causes engine 22 to be cranked by the motor MG1 and started with transmission of electric power to and from the high voltage battery 50 as described above.

When the abnormality detection time thv is equal to or longer than the specified time thv2 at step S280, on the other hand, the HVECU 70 determines a failure to start the engine 22, switches off the latch signal input to the OR circuit 61 (step S310) and terminates this routine. When the abnormality detection time thv is equal to or longer than the specified time thv2, the drive signal input from the battery ECU 52 to the OR circuit 61 is expected to be OFF signal. Accordingly, switching off the latch signal input from the HVECU 70 to the OR circuit 61 is expected to turn off the system main relay 56. The hybrid vehicle 20 accordingly runs without power.

When it is determined at step S250 that the engine 22 operates, the HVECU 70 switches off the latch signal input to the OR circuit 61 (step S330). In the case where the latch signal input from the HVECU 70 to the OR circuit 61 is switched off, the system main relay 56 is kept on when the drive signal input from the battery ECU 52 to the OR circuit 61 is ON signal, while being turned off when the drive signal input from the battery ECU 52 to the OR circuit 61 is OFF signal. The drive signal input from the battery ECU 52 to the OR circuit 61 is OFF signal when the battery ECU 52 is at stop, as well as when the battery ECU 52 operates and the abnormality detection time tbt becomes equal to or longer than the specified time tbt1.

The HVECU 70 subsequently compares the abnormality detection time thv with the specified time thv2 (step S340). When the abnormality detection time thv is shorter than the specified time thv2, the HVECU 70 sets the drive mode to a driving limit mode (step S350) and terminates this routine. The driving limit mode causes self-sustaining operation of the engine 22 and shuts off the gates of the inverters 41 and 42. When the abnormality detection time thv is shorter than the specified time thv2, the drive signal input from the battery ECU 52 to the OR circuit 61 is kept as ON signal, so that the system main relay 56 is likely to be kept on. Accordingly, the procedure of this embodiment sets the drive mode to the driving limit mode and thereby prohibits the high voltage battery 50 from being charged and discharged.

When the abnormality detection time thv is equal to or longer than the specified time thv2 at step S340, on the other hand, the HVECU 70 sets the drive mode to the battery-less drive mode (step S360) and terminates this routine. When the abnormality detection time thv is equal to or longer than the specified time thv2, the drive signal input from the battery ECU 52 to the OR circuit 61 is OFF signal. The system main relay 56 is expected to be turned off when both the drive signal and the latch signal are OFF signals. The hybrid vehicle 20 accordingly runs in the battery-less drive mode.

In the case where an abnormality of communication occurring between the battery ECU 52 and the HVECU 70 disappears before the drive signal input from the battery ECU 52 to the OR circuit 61 is switched off (i.e., in the state that the abnormality detection time tbt is shorter than the specified time tbt1), the system main relay 56 is kept on. In this case, the hybrid vehicle 20 does not shift to the battery-less drive mode but runs in either the HV drive mode or the EV drive mode.

Figure 5:
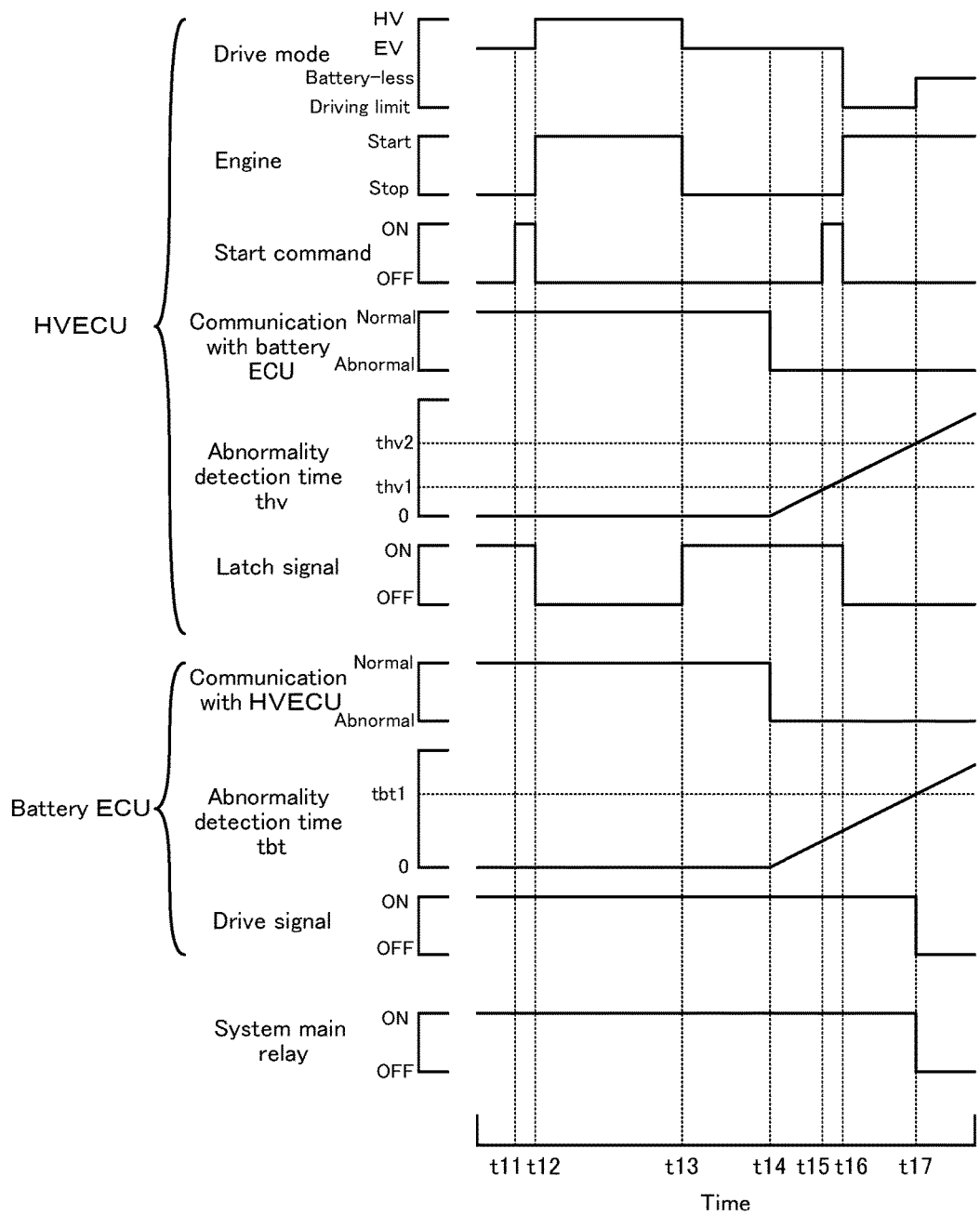
FIG. 5 is a diagram illustrating an example when an abnormality of communication between the battery ECU and the HVECU occurs during a run.
Figure 6:
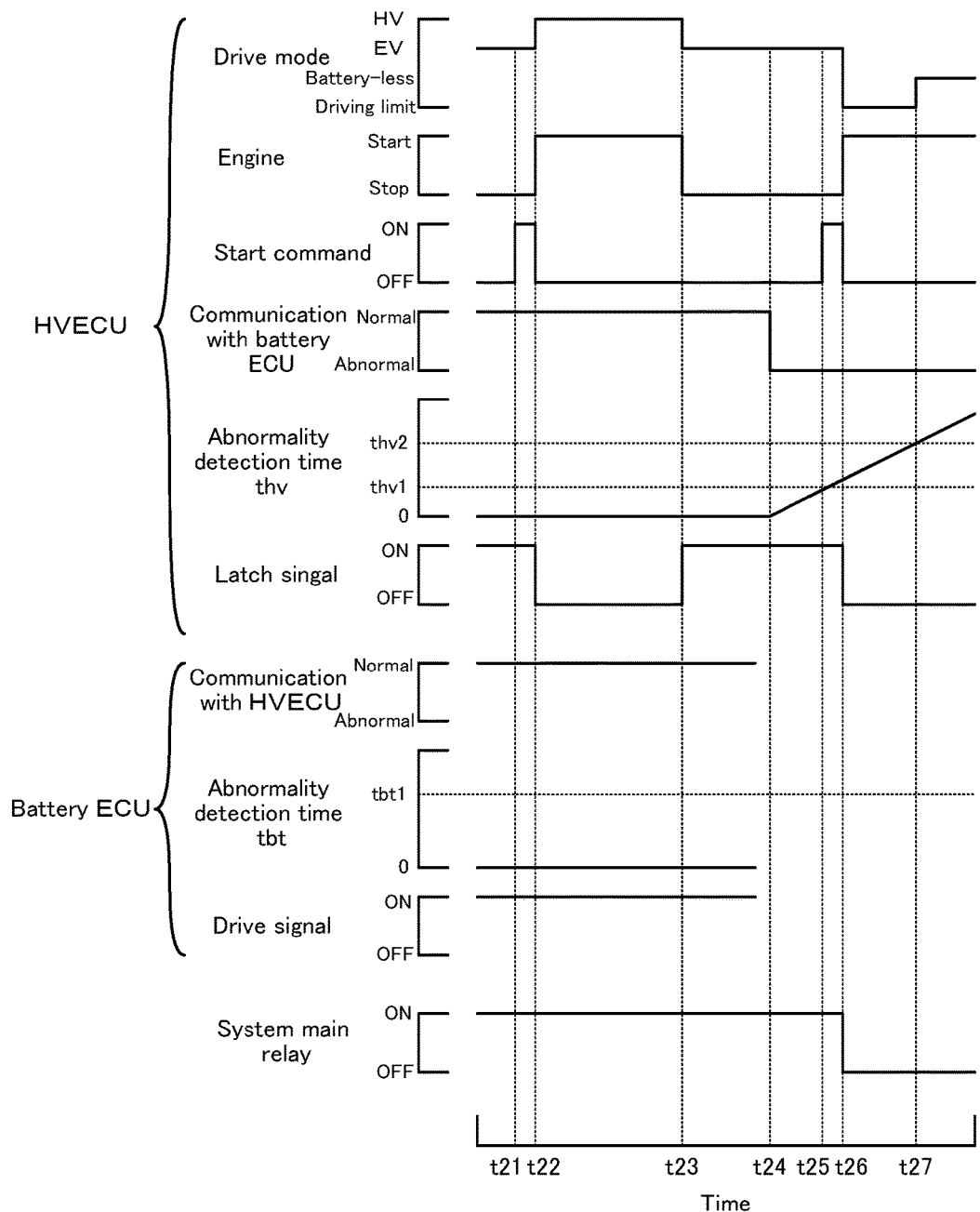
FIG. 6 is a diagram illustrating an example when an abnormality of communication between the battery ECU and the HVECU occurs during a run.

FIGS. 5 and 6 are diagrams illustrating examples when an abnormality of communication between the battery ECU 52 and the HVECU 70 occurs during a run. FIG. 5 shows the case where an abnormality of communication occurs between the battery ECU 52 and the HVECU 70 during operation of the battery ECU 52. FIG. 6 shows the case where an abnormality of communication occurs between the battery ECU 52 and the HVECU 70 at a stop of the battery ECU 52. The following sequentially describes the cases of FIG. 5 and FIG. 6.

The case of FIG. 5 is described first. In the case of FIG. 5, for the simplicity of discussion, it is assumed that the timing when the HVECU 70 determines (detects) an abnormality of communication with the battery ECU 52 is identical with the timing when the battery ECU 52 determines (detects) an abnormality of communication with the HVECU 70 (at time t14) and that the timing when the abnormality detection time thv becomes equal to or longer than the specified time thv2 is identical with the timing when the abnormality detection time tbt becomes equal to or longer than the specified time tbt1 (at time t17).

In the case of FIG. 5, on satisfaction of the start conditions of the engine 22 during a run in the EV drive mode (at time t11), the engine 22 is started by the cooperative control of the HVECU 70 and the engine ECU 24. On completion of starting the engine 22 (at time t12), the HVECU 70 switches the drive mode from the EV drive mode to the HV drive mode and switches the latch signal input to the OR circuit 61 from ON signal to OFF signal. On satisfaction of the stop conditions of the engine 22 during a run in the HV drive mode (at time t13), the cooperative control of the HVECU 70 and the engine ECU 24 stops the engine 22, switches the drive mode from the HV drive mode to the EV drive mode, and switches the latch signal input to the OR circuit 61 from OFF signal to ON signal.

When detecting an abnormality of communication with the battery ECU 52 (at time t14), the HVECU 70 starts counting the abnormality detection time thv. In parallel with this process, when detecting an abnormality of communication with the HVECU 70 (at time t14), the battery ECU 52 starts counting the abnormality detection time tbt. When the abnormality detection time thv becomes equal to or longer than the specified time thv1 (at time t15), the HVECU 70 starts the engine 22. The latch signal input from the HVECU 70 to the OR circuit 61 is ON signal in this state, so that the system main relay 56 is kept on. Accordingly the engine 22 is cranked by the motor MG1 and started with transmission of electric power to and from the high voltage battery 50.

On completion of starting the engine 22 (at time t16), the HVECU 70 switches the drive mode from the EV drive mode to the driving limit mode and switches the latch signal input to the OR circuit 61 from ON signal to OFF signal. In this state, the abnormality detection time tbt is shorter than the specified time tbt1, and the drive signal input to the OR circuit 61 is ON signal. The system main relay 56 is accordingly kept on. When the abnormality detection time tbt becomes equal to or longer than the specified time tbt1 (at time t17), the battery ECU 52 switches the drive signal input to the OR circuit 61 from ON signal to OFF signal. At this moment, both the drive signal and the latch signal input to the OR circuit 61 are OFF signals, so that the system main relay 56 is turned off. When the abnormality detection time thv becomes equal to or longer than the specified time thv2 (at time t17), the HVECU 70 switches the drive mode from the driving limit mode to the battery-less drive mode and starts a run in the battery-less drive mode. This causes the hybrid vehicle 20 to run in the battery-less drive mode.

The case of FIG. 6 is described below. Times t21 to t23 in FIG. 6 correspond to the times t11 to t13 in FIG. 5. Times 24 to t27 with regard to the HVECU 70 in FIG. 6 correspond to the times t14 to t17 with regard to the HVECU 70 in FIG. 5.

In the case of FIG. 6, when the battery ECU 52 stops at a time between the time t23 and the time t24, the HVECU 70 detects an abnormality of communication with the battery ECU 52 (at time t24) and starts counting the abnormality detection time thv. When the abnormality detection time thv becomes equal to or longer than the specified time thv1 (at time t25), the HVECU 70 starts the engine 22. On completion of starting the engine 22 (at time t26), the HVECU 70 switches the drive mode from the EV drive mode to the driving limit mode and switches the latch signal input to the OR circuit 61 from ON signal to OFF signal. In this state, the battery ECU 52 is at stop, so that the system main relay 56 is turned off by switching off the latch signal. The HVECU 70 cannot determine whether the battery ECU 52 operates or at stop. When the abnormality detection time thv becomes equal to or longer than the specified time thv2 (at time t27), the HVECU 70 switches the drive mode from the driving limit mode to the battery-less drive mode and starts a run in the battery-less mode. This causes the hybrid vehicle 20 to run in the battery-less drive mode.

In the hybrid vehicle 20 of the embodiment described above, when the HVECU 70 detects an abnormality of communication with the battery ECU 52 during stop of operation of the engine 22, the latch signal input from the HVECU 70 to the OR circuit 61 of the relay drive unit 60 is kept on. This results in keeping on the system main relay 56. The cooperative control of the HVECU 70 and the engine ECU 24 causes the engine 22 to be cranked by the motor MG1 and started with transmission of electric power to and from the high voltage battery 50. After a start of the engine 22, when both the drive signal input from the battery ECU 52 to the OR circuit 61 and the latch signal input from the HVECU 70 to the OR circuit 61 are OFF signals, the system main relay 56 is turned off. This leads to a run of the hybrid vehicle 20 in the battery-less drive mode. When there is a need to shift from a run in the EV drive mode to a run in the battery-less drive mode, this control reliably ensures that the engine 22 is started and the hybrid vehicle 20 runs in the battery-less drive mode.

In the hybrid vehicle 20 of the embodiment, in the case where no abnormality of communication with the battery ECU 52 is detected, the HVECU 70 switches off the latch signal input to the OR circuit 61 when the engine 22 operates, while switching on the latch signal input to the OR circuit 61 when the engine 22 is at stop. According to a modification, in the case where no abnormality of communication with the battery ECU 52 is detected, the HVECU 70 may switch on the latch signal input to the OR circuit 61 whether the engine 22 operates or is at stop.

In the hybrid vehicle 20 of the embodiment, in the case where no abnormality of communication with the battery ECU 52 is detected and the engine 22 is at stop, the HVECU 70 waits until the abnormality detection time thv becomes equal to or longer than the specified time thv1 to start the engine 22. According to a modification, in the case where no abnormality of communication with the battery ECU 52 is detected and the engine 22 is at stop, the HVECU 70 may start the engine 22 without waiting until the abnormality detection time thv becomes equal to or longer than the specified time thv1.

In the hybrid vehicle 20 of the embodiment, in the case where an abnormality of communication with the HVECU 70 is detected, the battery ECU 52 waits until the abnormality detection time tbt becomes equal to or longer than the specified time tbt1 to switch the drive signal input to the OR circuit 61 from ON signal to OFF signal. According to a modification, the battery ECU 52 may switch the drive signal input to the OR circuit 61 from ON signal to OFF signal without waiting until the abnormality detection time tbt becomes equal to or longer than the specified time tbt1.

In the hybrid vehicle 20 of the embodiment, in the case where an abnormality of communication with the battery ECU 52 is detected and the engine 22 operates, the HVECU 70 sets the drive mode to the driving limit mode when the abnormality detection time thv is shorter than the specified time thv2, while switching the drive mode to the battery-less drive mode when the abnormality detection time thv becomes equal to or longer than the specified time thv2. According to a modification, in the case where an abnormality of communication with the battery ECU 52 is detected and the engine 22 operates, the HVECU 70 may switch the drive mode to the battery-less drive mode without waiting until the abnormality detection time thv becomes equal to or longer than the specified time thv2. In this latter case, the drive signal input from the battery ECU 52 o the OR circuit 61 is kept as ON signal, so that the system main relay 56 is likely to be kept on. Accordingly, some embodiments control the engine 22 and the motors MG1 and MG2 such that the hybrid vehicle 20 runs without charging and discharging the high voltage battery 50.

In the hybrid vehicle 20 of the embodiment, as shown in FIG. 2, the relay drive unit 60 includes the OR circuit 61, the switching element 62 and the inverting circuit 63. According to a modification, the relay drive unit 60 may be configured without the switching element 62 and the inverting circuit 63. In this modified configuration, the coil 57 of the system main relay 56 has one terminal 57a grounded and the other terminal 57b connected with the output terminal of the OR circuit 61.

Figure 7:
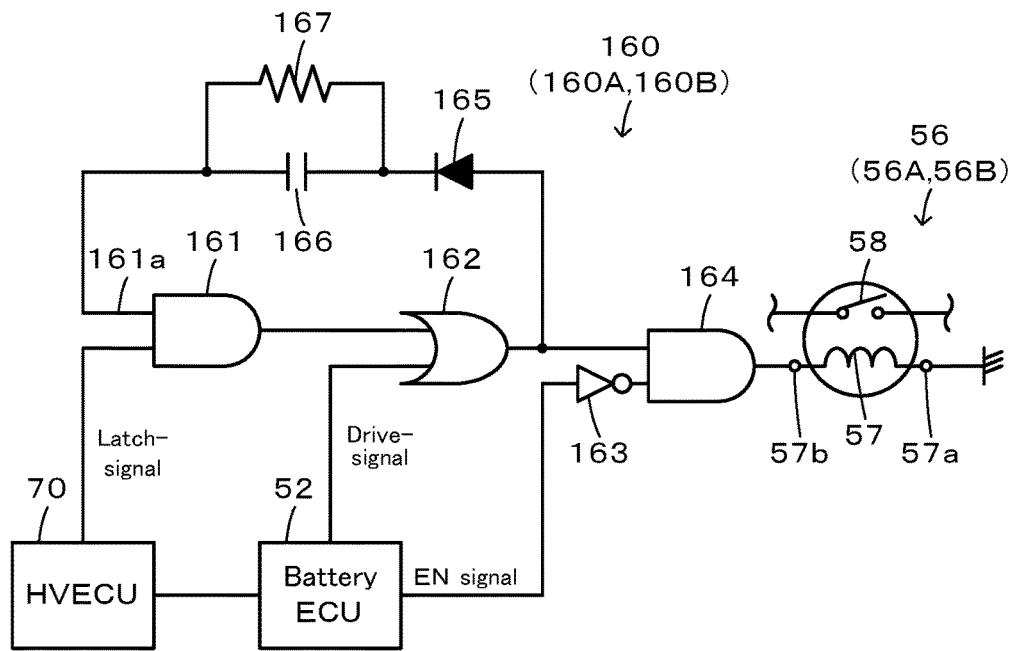
FIG. 7 is a configuration diagram illustrating the schematic configuration of the relay drive unit and their peripheries.

The hybrid vehicle 20 of the embodiment includes the relay drive unit 60 configured as shown in FIG. 2. According to a modification, a hybrid vehicle may include a relay drive unit 160 configured as shown in FIG. 7. The relay drive unit 160 shown in FIG. 7 includes a positive electrode-side unit 160A and a negative electrode-side unit 160B to turn on and off the positive electrode-side relay 56A and the negative electrode-side relay 56B. The positive electrode-side unit 160A and the negative electrode-side unit 160B are similarly configured. In the following description, the configurations and the operations of the positive electrode-side unit 160A and the negative electrode-side unit 160B are described as the configuration and the operation of the relay drive unit 160.

The relay drive unit 160 includes an AND circuit 161, an OR circuit 162, an inverting circuit 163, an AND circuit 164, a diode 165, a capacitor 166 and a resistance 167. The coil 57 of the system main relay 56 has one terminal 57a grounded and the other terminal 57b connected with an output terminal of the AND circuit 164.

The AND circuit 161 inputs a signal from the HVECU 70 (latch signal) and a signal (potential) of a connection line 161a which one terminal of the capacitor 166 is connected with and outputs their logical product. More specifically, the AND circuit 161 provides an ON output when the latch signal input from the HVECU 70 is ON signal and the potential of the connection line 161a is equal to or higher than a reference value Vref, while providing an OFF output when the latch signal input from the HVECU 70 is OFF signal and/or when the potential of the connection line 161a is lower than the reference value Vref. The OR circuit 162 inputs a signal from the AND circuit 161 and a signal from the battery ECU 52 (drive signal) and outputs their logical sum. More specifically, the OR circuit 162 provides an ON output when the output from the AND circuit 161 is ON output and/or when the drive signal input from the battery ECU 52 is ON signal, while providing an OFF output when the output from the AND circuit 161 is OFF output and the drive signal input from the battery ECU 52 is OFF signal. The inverting circuit 163 inputs a signal from the battery ECU 52 (EN signal), inverts the input signal and outputs the inverted signal. More specifically, the inverting circuit 163 provides an ON output when the EN signal input from the battery ECU 52 is OFF signal, while providing an OFF output when the EN signal input from the battery ECU 52 is ON signal. The AND circuit 164 inputs a signal from the OR circuit 162 and a signal from the inverting circuit 163 and outputs their logical product to the other terminal 57b of the coil 57. More specifically, the AND circuit 164 provides an ON output (to set the potential of the other terminal 57b of the coil 57 to a specified positive potential) when the output from the OR circuit 162 is ON output and the output from the inverting circuit 163 is ON output, while providing an OFF output (to set the potential of the other terminal 57b of the coil 57 to value 0) when the output from the OR circuit 162 is OFF output and/or when the output from the inverting circuit 163 is OFF output. The diode 165 is connected with an output terminal of the OR circuit 162 and with the other terminal of the capacitor 166, such that the direction from the output terminal of the OR circuit 162 to the other terminal of the capacitor 166 is forward direction. The resistance 167 is connected in parallel with the capacitor 166.

As in the relay drive unit 60 of the embodiment, in this relay drive unit 160, the EN signal is generally off. When the drive signal input from the battery ECU 52 is ON signal, the OR circuit 162 provides an ON output, and the AND circuit 164 provides an ON output. This supplies electricity to the coil 57 to turn on the system main relay 56. In this state, the OR circuit 162 provides an ON output (specified positive potential) to the AND circuit 164, so that electric charge is accumulated in the capacitor 166 via the diode 165. In the case where the latch signal input from the HVECU 70 to the OR circuit 162 is ON signal, when the drive signal input from the battery ECU 52 to the OR circuit 162 is subsequently switched off, the AND circuit 161, the OR circuit 162 and the AND circuit 164 respectively provide ON outputs until the electric charge accumulated in the capacitor 166 is consumed by the resistance 167 (i.e., as long as the potential of the connection line 161a is equal to or higher than the reference value Vref). This keeps on the system main relay 56. By taking into account these conditions, like the embodiment described above, this modification switches on the latch signal input from the HVECU 70 to the AND circuit 161 when the engine 22 is at stop. Like the above embodiment, on detection of an abnormality of communication with the battery ECU 52 during stop of operation of the engine 22, this modification keeps on the latch signal to keep on the system main relay 56, causes the engine 22 to be cranked by the motor MG1 and started with transmission of electric power to and from the high voltage battery 50 and causes the hybrid vehicle to run in the battery-less drive mode. In the relay drive unit 160 of this modification, when the electric charge in the capacitor 166 is consumed (i.e., when the potential of the connection line 161a becomes lower than the reference value Vref), the AND circuit 161 provides an OFF output whether the latch signal input from the HVECU 70 to the AND circuit 161 is ON signal or OFF signal. The system main relay 56 is accordingly kept off until the drive signal input from the battery ECU 52 to the OR circuit 162 is switched on.

The relay drive unit 160 of this modification includes the OR circuit 162, the inverting circuit 163 and the AND circuit 164 as shown in FIG. 7. According to a further modification, the relay drive unit 160 may be configured without the inverting circuit 163 and the AND circuit 164. In this modification, the output terminal of the OR circuit 162 is connected with the other terminal 57b of the coil 57 and with the diode 165.

In the hybrid vehicle 20 of the embodiment, the drive signal is output from the battery ECU 52 to the OR circuit 61 of the relay drive unit 60, and the latch signal is output from the HVECU 70 to the OR circuit 61. According to a modification, the drive signal may be output from the HVECU 70 to the OR circuit 61, and the latch signal may be output from the battery ECU 52 to the OR circuit 61.

Figure 8:
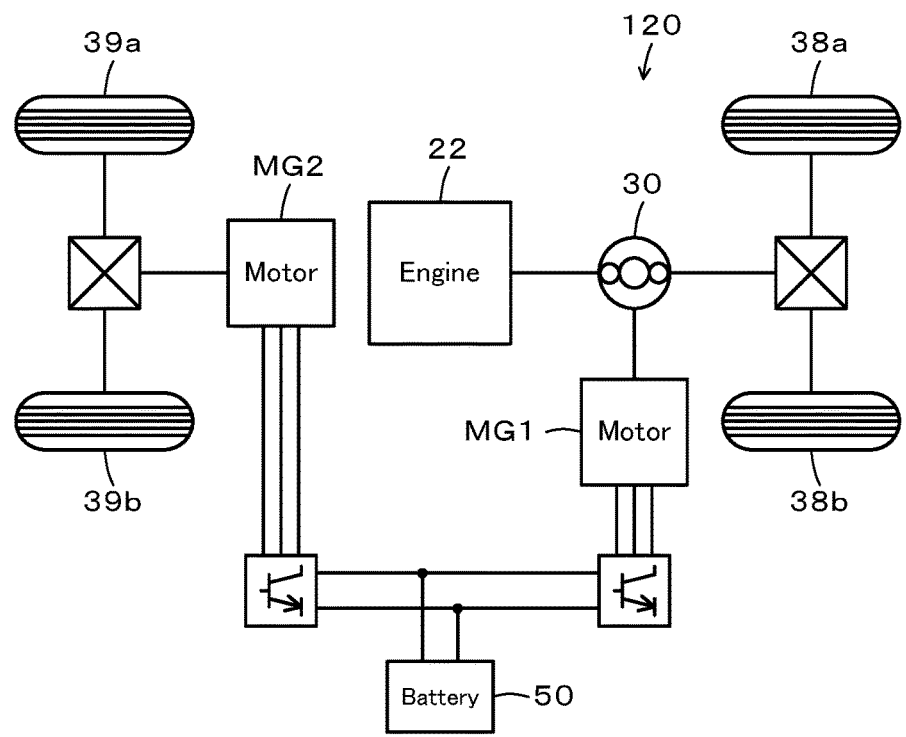
FIG. 8 is a configuration diagram illustrating the schematic configuration of a hybrid vehicle according to a modification.

In the hybrid vehicle 20 of the embodiment, the power of the motor MG2 is output to the driveshaft 36 linked with drive wheels 38a and 38b. In one possible modification shown as a hybrid vehicle 120 of FIG. 8, the power of the motor MG2 may be output to another axle (that is, an axle linked with wheels 39a and 39b of FIG. 8), which is different from an axle connected with the driveshaft 36 (that is, an axle linked with the drive wheels 38a and 38b).

In the hybrid vehicle of the above aspect, the first controller may output the drive latch signal to the drive unit, and the second controller may output the drive signal to the drive unit.

In the hybrid vehicle of the above aspect where the first controller outputs the drive latch signal and the second controller outputs the drive signal, when the engine is at stop, the first controller may switch on the drive latch signal, and when a first abnormality that is an abnormality of communication with the second controller is detected during stop of operation of the engine, the first controller may start the engine and may switch off the drive latch signal after a start of the engine.

In the hybrid vehicle of the above aspect where the drive latch signal is switched off or switched on according to whether the engine operates or is at stop, the second controller may switch on the drive signal when a second abnormality that is an abnormality of communication with the first controller is not detected and when detection of the second abnormality does not continue for a specified first time duration, and the second controller may switch off the drive signal when detection of the second abnormality continues for the specified first time duration. In this aspect, in the case where detection of the second abnormality by the second controller does not continue for the specified first time duration, when the abnormality of communication between the second controller and the first controller disappears, the relay is kept on. In this case, the hybrid vehicle may not shift to the battery-less drive but may run with intermittent operation of the engine in the on state of the relay.

In the hybrid vehicle of the above aspect where the drive signal is switched on or switched off according to whether the second controller detects the second abnormality and according to the time duration of continuation of detection of the second abnormality, when the first abnormality is detected and detection of the first abnormality does not continue for a specified second time duration that is equal to or longer than the specified first time duration, in a state that the engine operates, the first controller may allow for self-sustaining operation of the engine and may shut off gates of a first inverter and a second inverter that are configured to respectively drive the first motor and the second motor, and when the first abnormality is detected and detection of the first abnormality continues for the specified second time duration, the first controller may control the engine, the first motor and the second motor to cause the hybrid vehicle to run with output of power from the engine. When detection of the first abnormality by the first controller does not continue for the specified second time duration, there is a possibility that the drive signal output from the second controller is on signal and that the relay is kept on by the drive unit. When detection of the first abnormality by the first controller does not continue for the specified second time duration, in the state that the engine operates, the first controller allows for self-sustaining operation of the engine and shuts off the gates of the first and the second inverters. This suppresses transmission of electric power between the first and second motors and the battery. When detection of the first abnormality by the first controller continues for the specified second time duration, on the other hand, it is expected that the drive signal output from the second controller is off signal. In this state, in the case where the engine operates, the drive latch signal output from the first controller is also off signal. Accordingly the relay is expected to be turned off by the drive unit. This allows for the battery-less drive of the hybrid vehicle.

In the hybrid vehicle of the above aspect where the first controller outputs the drive latch signal and the second controller outputs the drive signal, the second controller may output a drive stop signal for turning off the relay, in addition to the drive signal to the drive unit, and when the drive stop signal is on signal, the drive unit may turn off the relay whether the drive signal is on signal or off signal and whether the drive latch signal is on signal or off signal. When there is a need to forcibly turn off the relay, this configuration enables the relay to be turned off whether the drive signal is on signal or off signal and whether the drive latch signal is on signal or off signal.

In the hybrid vehicle of the above aspect, the hybrid vehicle may further includes a planetary gear that is configured to have three rotational elements connected with a rotating shaft of the first motor, an output shaft of the engine and a driveshaft linked with drive wheels such that the rotating shaft, the output shaft and the driveshaft are arrayed in this sequence in a collinear diagram. The second motor may be configured to input and output power from and to the driveshaft.

The following describes the correspondence relationship between components of the embodiment and components described in the Summary according to some embodiments. The engine 22 of the embodiment corresponds to the "engine"; the motor MG1 corresponds to the "first motor"; the motor MG2 corresponds to the "second motor"; the high voltage battery 50 corresponds to the "battery"; the system main relay 56 corresponds to the "relay"; the relay drive unit 60 corresponds to the "drive unit"; the HVECU 70 and the engine ECU 24 correspond to the "first controller" and the battery ECU 52 corresponds to the "second controller".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

INDUSTRIAL APPLICABILITY

The disclosed subject matter is applicable to the manufacturing industries of hybrid vehicle.

The invention claimed is:

1. A hybrid vehicle, comprising
an engine that is configured to output power for driving;
a first motor that is configured to input and output power from and to an output shaft of the engine;
a second motor that is configured to input and output power for driving;
a battery that is configured to be chargeable and dischargeable;
a relay that is configured to connect and disconnect the first motor and the second motor with and from the battery;
a first controller that is configured to control the engine, the first motor and the second motor;
a second controller that is configured to manage the battery; and
a drive unit that is configured to turn on and off the relay, wherein
one controller of the first controller and the second controller outputs a drive signal for turning on the relay, to the drive unit,
the other controller of the first controller and the second controller outputs a drive latch signal for keeping on the relay, to the drive unit, and
the drive unit turns on the relay when at least one of the drive signal and the drive latch signal is on signal, and turns off the relay when both the drive signal and the drive latch signal are off signals.

2. The hybrid vehicle according to claim 1,
wherein the first controller outputs the drive latch signal to the drive unit, and
the second controller outputs the drive signal to the drive unit.

3. The hybrid vehicle according to claim 2,
wherein when the engine is at stop, the first controller switches on the drive latch signal, and
when a first abnormality that is an abnormality of communication with the second controller is detected during stop of operation of the engine, the first controller starts the engine and switches off the drive latch signal after a start of the engine.

4. The hybrid vehicle according to claim 3,
wherein the second controller switches on the drive signal when a second abnormality that is an abnormality of communication with the first controller is not detected and when detection of the second abnormality does not continue for a specified first time duration, and the second controller switches off the drive signal when detection of the second abnormality continues for the specified first time duration.

5. The hybrid vehicle according to claim 4,
wherein when the first abnormality is detected and detection of the first abnormality does not continue for a specified second time duration that is equal to or longer than the specified first time duration, in a state that the engine operates, the first controller allows for self-sustaining operation of the engine and shuts off gates of a first inverter and a second inverter that are configured to respectively drive the first motor and the second motor, and when the first abnormality is detected and detection of the first abnormality continues for the specified second time duration, the first controller controls the engine, the first motor and the second motor to cause the hybrid vehicle to run with output of power from the engine.

6. The hybrid vehicle according to claim 2,
wherein the second controller outputs a drive stop signal for turning off the relay, in addition to the drive signal to the drive unit, and when the drive stop signal is on signal, the drive unit turns off the relay whether the drive signal is on signal or off signal and whether the drive latch signal is on signal or off signal.

7. The hybrid vehicle according to claim 3,
wherein the second controller outputs a drive stop signal for turning off the relay, in addition to the drive signal to the drive unit, and when the drive stop signal is on signal, the drive unit turns off the relay whether the drive signal is on signal or off signal and whether the drive latch signal is on signal or off signal.

8. The hybrid vehicle according to claim 4,
wherein the second controller outputs a drive stop signal for turning off the relay, in addition to the drive signal to the drive unit, and when the drive stop signal is on signal, the drive unit turns off the relay whether the drive signal is on signal or off signal and whether the drive latch signal is on signal or off signal.

9. The hybrid vehicle according to claim 5,
wherein the second controller outputs a drive stop signal for turning off the relay, in addition to the drive signal to the drive unit, and when the drive stop signal is on signal, the drive unit turns off the relay whether the drive signal is on signal or off signal and whether the drive latch signal is on signal or off signal.

10. The hybrid vehicle according to claim 1, further comprising
a planetary gear that is configured to have three rotational elements connected with a rotating shaft of the first motor, an output shaft of the engine and a driveshaft linked with drive wheels such that the rotating shaft, the output shaft and the driveshaft are arrayed in this sequence in a collinear diagram, wherein the second motor is configured to input and output power from and to the driveshaft.

* * * * *